US009553681B2

(12) United States Patent
Hoffman

(10) Patent No.: US 9,553,681 B2
(45) Date of Patent: Jan. 24, 2017

(54) SOURCE SEPARATION USING NONNEGATIVE MATRIX FACTORIZATION WITH AN AUTOMATICALLY DETERMINED NUMBER OF BASES

(71) Applicant: Adobe Systems Incorporated, San Jose, CA (US)

(72) Inventor: Matthew Douglas Hoffman, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 44 days.

(21) Appl. No.: 14/624,220

(22) Filed: Feb. 17, 2015

(65) Prior Publication Data

US 2016/0241346 A1    Aug. 18, 2016

(51) Int. Cl.
| H04B 15/00 | (2006.01) |
| G10L 21/02 | (2013.01) |
| G10L 21/0224 | (2013.01) |
| G10L 21/0232 | (2013.01) |
| G10L 21/0208 | (2013.01) |

(52) U.S. Cl.
CPC ............ *H04B 15/00* (2013.01); *G10L 21/02* (2013.01); *G10L 21/0224* (2013.01); *G10L 21/0232* (2013.01); *G10L 21/0208* (2013.01)

(58) Field of Classification Search
CPC ........... G10L 21/0232; G10L 21/0208; G10L 21/02165
USPC ................ 381/94.1–94.3, 66; 704/226, 233, 704/256.1–256.2
See application file for complete search history.

(56) References Cited

U.S. PATENT DOCUMENTS

| 8,812,322 | B2 | 8/2014 | Mysore et al. |
| 8,843,364 | B2 | 9/2014 | Mysore et al. |
| 2009/0132245 | A1* | 5/2009 | Wilson ............... G10L 21/0272 704/226 |
| 2013/0121506 | A1 | 5/2013 | Mysore et al. |

(Continued)

OTHER PUBLICATIONS

J.Paisley. "Bayesian nonnegative matrix factorization with stochastic variational inference", 2014.*

(Continued)

*Primary Examiner* — Disler Paul
(74) *Attorney, Agent, or Firm* — Kilpatrick Townsend & Stockton LLP

(57) ABSTRACT

Methods and systems for source separation based on determining a number of bases for a nonnegative matrix factorization (NMF) model are disclosed. A method includes receiving, at a computing device, a mixed signal including a combination of first signal data and second signal data. The method also includes generating, by the computing device, a time-frequency representation of the mixed signal. The method further includes determining, by applying a structured stochastic variational inference (SSVI) algorithm to the NMF model, a number of bases for a dictionary of signal-related components of the mixed signal. The method uses the number of bases and the time-frequency representation to construct the dictionary and an activation matrix of weights, the weights indicating how active each one of the signal-related components is at a given time. The method then uses the dictionary and the activation matrix to separate the first signal data from the second signal data.

20 Claims, 8 Drawing Sheets

(56) References Cited

U.S. PATENT DOCUMENTS

2015/0348537 A1* 12/2015 Le Roux ............... G10L 15/063
 704/236
2016/0232914 A1* 8/2016 Liang .................. G10L 21/0205

OTHER PUBLICATIONS

Smaragdis et al., "Non-negative matrix factorization for polyphonic music transcription," IEEE Workshop on Applications of Signal Processing to Audio and Acoustics, 2003, pp. 177-180.
Smaragdis et al., "Sparse and shift-invariant feature extraction from non-negative data," ICASSP 2008, pp. 2069-2072.
Cemgil, "Bayesian inference for nonnegative matrix factorisation models," Computational Intelligence and Neuroscience, vol. 2009, pp. 4:1-4:17, Jan. 2009.
Févotte et al., "Nonnegative matrix factorizations as probabilistic inference in composite models," Proc. 17th European Signal Processing Conf. (EUSIPCO), Glasgow, Scotland, 2009, pp. 1913-1917.
Hoffman et al., "Bayesian nonparametric matrix factorization for recorded music," International Conference on Machine Learning, 2010.
Yoshii et al., "A nonparametric Bayesian multipitch analyzer based on infinite latent harmonic allocation," Audio, Speech, and Language Processing, IEEE Transactions vol. 20, No. 3, Mar. 2012, pp. 717-730.
Wainwright et al., "Graphical models, exponential families, and variational inference," Foundations and Trends in Machine Learning, vol. 1, No. 1-2, pp. 1-305, 2008.
Dikmen et al., "Nonnegative dictionary learning in the exponential noise model for adaptive music signal representation," Advances in Neural Information processing Systems, 2011, pp. 2267-2275.
Bronson et al., "Learning rates and states from biophysical time series: a bayesian approach to model selection and single-molecule fret data," Biophysical journal, vol. 97, No. 12, pp. 3196-3205, 2009.
Saul et al., "Exploiting Tractable Substructures in Intractable Networks," Advances in Neural Information Processing Systems 8, 1996, pp. 486-492.
Hoffman, "Structured Stochastic Variational Inference," Proceedings of the 18th International Conference on Artificial Intelligence and Statistics (AISTATS) 2015, San Diego, CA, 2015, pp. 361-369.
Lee et al., "Algorithms for Non-negative Matrix Factorization," Advances in Neural Information Processing Systems 13 (NIPS), 2001, pp. 556-562.
Bishop, Pattern Recognition and Machine Learning. Springer New York, 2006.
Hoffman et al., "Stochastic variational inference," Journal of Machine Learning Research 14, (2013), pp. 1303-1347.
Nakano et al., "Bayesian Nonparametric Spectrogram Modeling Based on Infinite Factorial Infinite Hidden Markov Model," 2011 IEEE Workshop on Applications of Signal Processing to Audio and Acoustics, Oct. 16-19, 2011, New Paltz, NY, pp. 325-328.
Hoffman, "A Problem With (and Fix for) Variational Bayesian NMF," GlobalSIP 2014: Machine Learning Applications in Speech Processing, pp. 527-531.

* cited by examiner

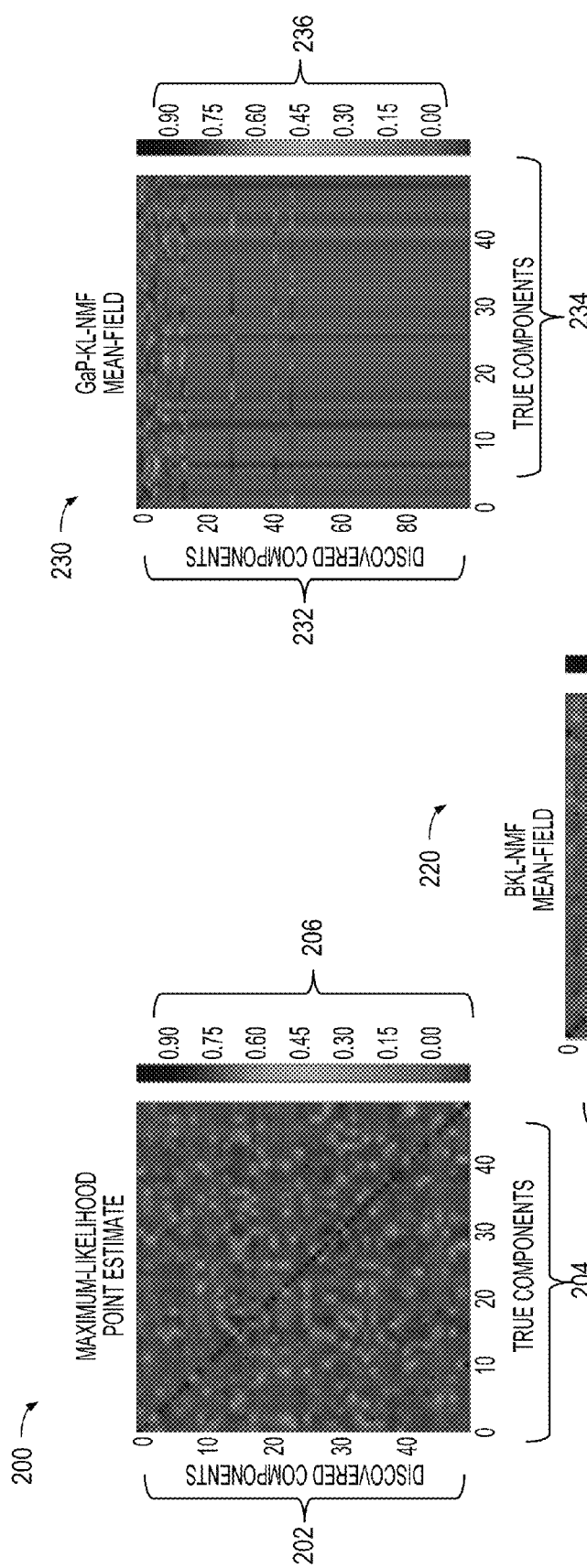
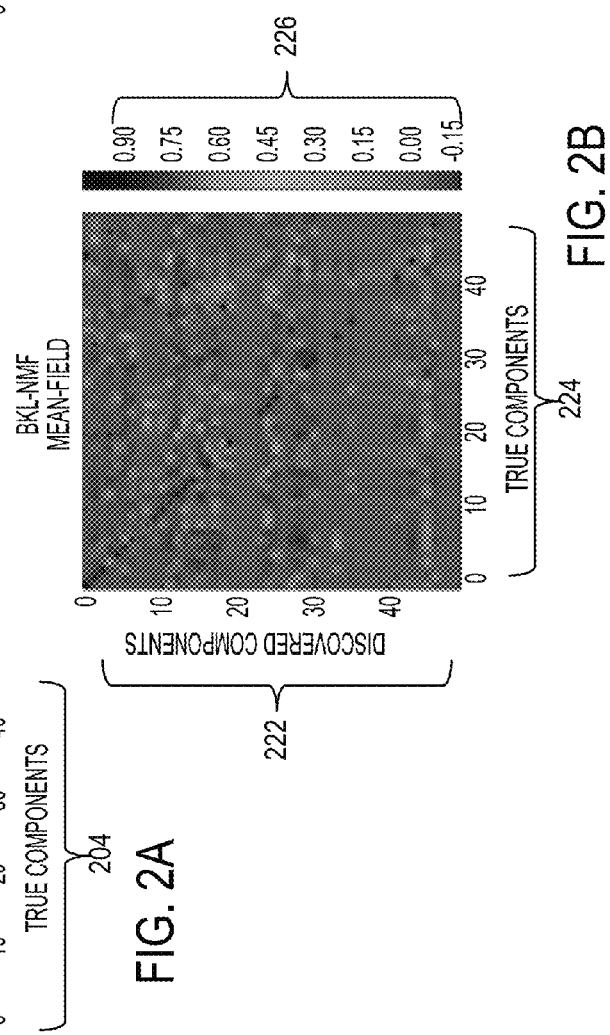
FIG. 2A
FIG. 2B
FIG. 2C

SOURCE SEPARATION USING NONNEGATIVE MATRIX FACTORIZATION WITH AN AUTOMATICALLY DETERMINED NUMBER OF BASES

TECHNICAL FIELD

This disclosure relates generally to computer-implemented methods and systems for source separation and more particularly relates to efficiently and automatically determining an appropriate number of bases for nonnegative matrix factorization (NMF) by using a structured stochastic variational inference (SSVI) algorithm and applying the SSVI algorithm to Bayesian nonparametric NMF data models.

BACKGROUND

In an audio or video signal, background noise is an unwanted signal that is transmitted together with the wanted audio or video signal. Conventional speech denoising and speech enhancement techniques use source separation to isolate this unwanted signal. The techniques model a noise signal with a single spectral profile that is estimated from several clean noise signal frames beforehand. However, when a background noise is non-stationary (i.e., having a noise spectrum that fluctuates or changes significantly and rapidly over time), these conventional techniques perform poorly. This is because non-stationary noises, such as keyboard noises or sirens, cannot be modeled well by a single spectrum.

Probabilistic formulations of nonnegative matrix factorization (NMF) source separation models have been used for audio source separation. In particular, Bayesian approaches have been used to handle uncertainty, enable hierarchical formulations, deal with hyperparameter learning, and automatically discover how many latent components are needed to model the data. These approaches use a dictionary comprising signal-related information such as representative signals and model parameters. An appropriate size for the dictionary is needed so that the dictionary is large enough for source separation algorithms to function properly. One issue with the NMF approaches is that they require that an appropriate number of dictionary elements be chosen a priori, before data modeling is performed.

Bayesian nonparametric (BNP) models have been used to address the requirement of choosing an appropriate number of dictionary elements a priori in NMF source separation models. For example, a Markov chain Monte Carlo (MCMC) model has been proposed. However, using such models can be computationally expensive and inefficient. Attempts to choose a number of dictionary elements using BNP models with variational inference algorithms to improve efficiency have been generally undesirable because using the variational algorithms has involved breaking dependencies between model parameters and variables. Breaking such dependencies can introduce local optima and thus reduce the accuracy of a source separation algorithm. Thus, prior techniques have only gained greater efficiencies at the cost of significantly sacrificing accuracy.

SUMMARY

In one embodiment, a method for source separation based on determining a number of bases for a nonnegative matrix factorization (NMF) model includes receiving, at a computing device, a mixed signal including a combination of first signal data and second signal data. The method also includes generating, by the computing device, a time-frequency representation of the mixed signal. The method further includes determining, by applying a structured stochastic variational inference (SSVI) algorithm to the NMF model, a number of bases for a dictionary of signal-related components of the mixed signal. The method uses the number of bases and the time-frequency representation to construct the dictionary and an activation matrix of weights, the weights indicating how active each one of the signal-related components is at a given time. The method then uses the dictionary and the activation matrix to separate the first signal data from the second signal data.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 2A is a matrix of correlations between true dictionary elements and dictionary elements discovered using a Kullback-Leibler nonnegative matrix factorization (KL-NMF) model, in accordance with embodiments;

FIG. 2B is a matrix of correlations between true dictionary elements and dictionary elements discovered using a Bayesian KL-NMF (BKL-NMF) model, in accordance with embodiments;

FIG. 2C is a matrix of correlations between true dictionary elements and dictionary elements discovered using a gamma process KL-NMF (GaP-KL-NMF) model, in accordance with embodiments;

DETAILED DESCRIPTION

Figure 1:
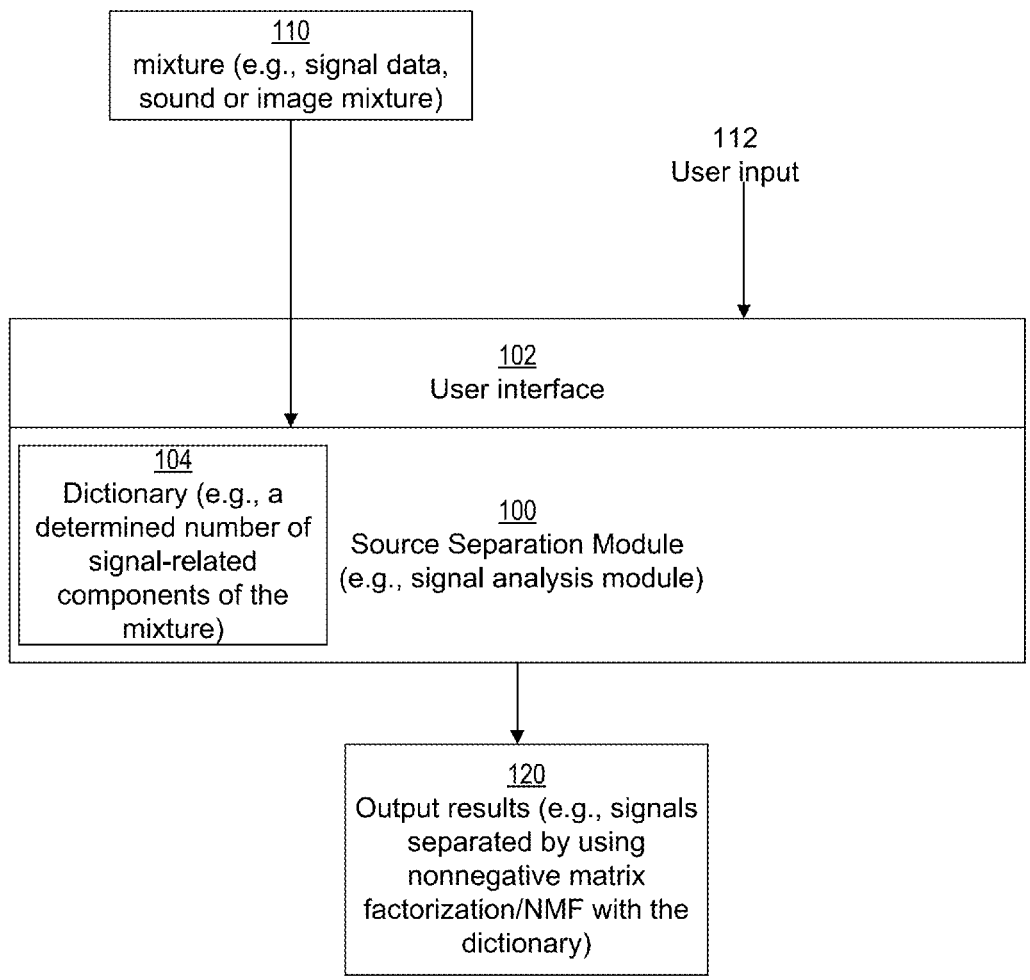
FIG. 1 is a block depicting components of a system for online source separation, in accordance with embodiments.

Nonnegative matrix factorization (NMF) can be used to solve source separation problems such as, for example, denoising and upmixing. Existing probabilistic formulations of NMF source separation models used for source separation require that an appropriate number of dictionary elements (which correspond to components of interest in a signal) be chosen a priori. Existing Bayesian nonparametric (BNP) models used to choose an appropriate number of dictionary elements are inefficient, inaccurate, or both. In particular, using BNP models with variational inference algorithms has been generally undesirable because it has involved breaking posterior dependencies between model parameters and latent variables, which reduces both the accuracy of the posterior approximation and the accuracy of inferences made based on that approximation. The invention disclosed herein restores some of the broken dependencies between the parameters of a BNP model (e.g., a dictionary matrix of isolated spectra, an activation matrix saying how active each latent component is as a function of time, or a vector controlling the overall gain of a latent component) and latent variables (e.g., how much energy a given latent component contributed at a given time and frequency) using a structured stochastic variational inference (SSVI) algorithm (also referred to as a stochastic structured mean-field (SSMF) algorithm). Restoring these dependencies allows the BNP model to automatically choose an appropriate number of bases, which allows the source separation algorithm to function more efficiently and accurately than with prior techniques.

Embodiments use a data model in conjunction with inference algorithms. A model is a purely mathematical object that expresses assumptions about how observed data (e.g., an input sound mixture) was generated. An inference algorithm is used in conjunction with the model and observed data to make inferences about the data (e.g., what energy is associated with which source). Example inference algorithms described herein include maximum-likelihood, mean-field, SSVI, and SSMF algorithms. An example stochastic variational inference (SVI) framework uses stochastic optimization to apply mean-field variational inference to massive datasets. For example, SVI can split the unobserved variables in a hierarchical model into global parameters $\beta$ (which are shared across all observations) and groups of local hidden variables $z_1; \ldots; z_N$ (each of which is specific to a small group of observations $y_n$). A goal of using the SVI framework and the SSVI algorithm is to minimize the Kullback-Leibler (KL) divergence between a tractable approximating distribution $q(z, \beta)$ over the local and global parameters and the true posterior $p(z,\beta\backslash y)$ over those parameters. The SSVI is an algorithm that can approximate posteriors much more quickly than traditional batch vibrational inference algorithms. Example techniques are provided for applying the SSVI algorithm to existing models. The SSVI algorithm is a generalization of the SVI framework that can restore the dependence between global and local variables. For example, the SSVI algorithm can approximate the posteriors $p(z,\beta\backslash y)$ of a wide class of models with distributions of the form $q(z, \beta)=(\Pi_k q(\beta_k)) \Pi_n q(z_n\backslash\beta)$, which can allow for arbitrary dependencies between $\beta$ and $z_n$. In some embodiments, restoring these dependencies allows the SSVI algorithm to find qualitatively and quantitatively better parameter estimates, avoiding the local optima and sensitivity to hyperparameters that can be an issue when using mean-field variational inference. An example approximate structured stochastic variational inference (SSVI-A) algorithm is provided herein as algorithm 1.

In some embodiments, a model and an inference algorithm, such as, for example, an SSVI algorithm can be combined to produce a concrete algorithm for solving a particular problem. That is, SSVI can be conceptualized as a meta-algorithm whose input is a model and whose output is an algorithm that can be applied directly to data. Embodiments provide technological methods for applying the algorithms that are produced by combining a SSVI algorithm with certain models. Example models described herein include a Kullback-Leibler nonnegative matrix factorization (KL-NMF) model, a Bayesian KL-NMF (BKL-NMF) model, and a gamma process KL-NMF (GaP-KL-NMF) model.

As used herein, the term "bases" generally refers to a dictionary for a data model. For example, a number of bases can represent the number of components in a dictionary used with an NMF model. The dictionary components can be signal-related components of a mixed signal and other data elements. For example, a dictionary can be populated with a collection of representative signals and data model parameters. If the number of bases is too low, the dictionary will be too small for source separation to be able to accurately identify all items of interest in a signal. For example, when there are too few bases, source separation may not be able to isolate components of interest in a signal from noise in the signal. If the number of bases is too high, the dictionary will be too large, in which case the learned bases may correspond to overly specific features of the audio signals, making it impossible to identify what energy came from what signal and again making it impossible for the source separation to isolate components of interest in a signal from noise in that signal.

Embodiments can be used for signal modeling and data analysis, such as, for example, audio-source separation for mixed signals (i.e., signals produced by two or more sources). The techniques disclosed herein can also be applied to other areas, such as, for example, web analytics and image recognition. In one example, a structured stochastic variational inference (SSVI) algorithm can be used for modeling text items, such as topics. In certain embodiments, the disclosed models and algorithms can be applied to recommendation problems. For example, by replacing a time-frequency-power spectrogram matrix with a user-item-purchases matrix, embodiments can produce recommendation results.

This disclosure describes techniques and systems for using a Bayesian nonparametric approach to automatically and efficiently select a number of dictionary elements that is sufficient, but not more than sufficient, to model the variability in an input spectrogram. In an embodiment, a spectrogram can be a time frequency representation of a signal, such as, for example, an audio signal. Embodiments apply an SSVI algorithm to effectively and efficiently learn large dictionaries even when the correct size of the dictionary is unknown. The methods and systems can be used for online source separation, data analysis, and data modeling. For example, when the input spectrogram includes audio data (e.g., audio signals), the techniques can be used for audio source separation and denoising. Also, for example, when the input spectrogram includes image data (e.g., video signals), the disclosed techniques can be used for image recognition. Further, for example, when the input spectrogram includes web analytics data and metrics (e.g., a user-item-purchases matrix), the techniques can be used to solve recommendation problems. When the input spectrogram includes text data, the techniques can also be used for modeling items occurring in the text, such as phrases or topics of interest.

A central computational problem in the Bayesian setting is posterior inference. Posterior inference refers to determining the posterior probability of a hypothesis by using a combination of the inherent likeliness of a prior hypothesis and the compatibility of observed evidence or data with the hypothesis. However, posterior inference is intractable to perform exactly using existing techniques. Embodiments address this by using variational inference algorithms in order to approximate intractable posterior parameters and data with a distribution of parameters chosen from some tractable family of distributions. This approximation is done in order to minimize Kullback-Leibler (KL) divergence between an approximating distribution q and the posterior. One implication of using variational inference methods for source separation is that these methods sometimes fail to fully use a model's expressive power. For example, NMF models that are fit using variational methods may not use all available dictionary components. Also, for example, hidden Markov models that are fit using variational Bayesian methods may not use all available hidden states. This phenomenon may be desirable when the data can be adequately explained by a simple model. However, when applied to NMF, mean-field variational inference tends to underestimate the number of latent components that are present in the data.

An embodiment addresses this underestimation issue by using a structured variational approximation that retains more of the dependencies between latent variables. For example, this can be achieved for NMF models using an SSVI algorithm. When applied to Bayesian nonparametric NMF models on synthetic data, the SSVI algorithm is able to discover many more latent components than conventional mean-field techniques.

Embodiments assume that the correct number of bases for an NMF model is not known ahead of time. Since the correct number of bases is not known a priori, embodiments initially use a large number of bases for the model. This gives the freedom to use a very large dictionary if desired, while also giving an incentive to prefer to use a smaller dictionary in order to reduce the computational expense associated with larger dictionaries. In cases where assumptions are correct and input signal data matches those assumptions correctly, a data model is able to figure out what is the correct number of bases to use to model the signal data.

Example System Environment

FIG. 1 shows an illustrative source separation system that may implement certain embodiments disclosed herein. In some embodiments, the system includes module 100, which can be implemented as an online source separation module. The module 100 may provide a user interface (UI) 102. In embodiments, UI 102 includes one or more UI elements that a user can interact with, select, or otherwise manipulate in order to carry out a method performed by module 100. Module 100 may be operable to obtain signal data (e.g., digital or analog signal data) for mixture 110. Mixture 110 can be a digital sampled signal that is subdivided or broken down into discrete windows of time (e.g., 20 milliseconds).

In the example of FIG. 1, mixture 110 can be signal data, such as, for example a sound or image mixture. In the case of a sound mixture, mixture 110 can be a non-stationary noise source combined with a speech source. As shown in FIG. 1, module 100 can also receive user input 112 indicating one or more signal sources. Module 100 can also be configured to perform data analysis using the signal data and the input 112. As described herein, module 100 can perform the data analysis using a variety of models. Based on the mixture 110, user input 112 received via UI 102, and the data analysis, module 100 can produce output results 120. In one embodiment, the module 100 may include or have access to additional or auxiliary signal-related information, such as dictionary 104. Dictionary 104 may be computed offline and can include signal-related information.

Dictionary 104 can be populated with a collection of representative signals and data model parameters associated with mixture 110. In one example, dictionary 104 can be constructed as a matrix having non-negative elements or components. An appropriate size for dictionary 104 is needed so that it is large enough for source separation module 100 to function properly. Dictionary 104 can be a matrix that stores components of mixture 110. As shown in FIG. 1, dictionary 104 can include a determined number of signal-related components. The size of dictionary 104 corresponds to the determined number (e.g., the number of bases). If the determined number of bases is too low, dictionary 104 will be too small for source separation module 100 to be able to accurately identify all items of interest in mixture 110. If the determined number is too high, dictionary 104 will be too large and source separation module 100 will be inefficient. Attempts to determine the number of dictionary elements using Bayesian nonparametric (BNP) models with variational inference algorithms can be unsuccessful because using the variational algorithms involves breaking dependencies between dictionary elements and latent variables. Breaking such dependencies can introduce local optima and thus reduce the accuracy of a source separation algorithm used by source separation module 100.

Additional information stored in dictionary 104 may alternatively include a collection of representative signals, model parameters, etc. As shown in FIG. 1, the output results 120 may include separated signals produced by using dictionary 104 and an NMF model. For example, the output results 120 may include one or more of the separated sources of mixture 110. In one example, if mixture 110 is a sound mixture pertaining to two or more audio signals, output results 120 can include separated audio signals corresponding to different audio sources that contributed to the mixture. Also, for example, if mixture 110 includes a video signal, output results 120 can include images recognized within mixture 110. Further, for example, if mixture 110 includes textual data, output results can include words or phrases related to a topic of interest.

Source separation module 100 may be implemented as or in a stand-alone application or as a module of or plug-in for a signal processing application, system, or platform. Examples of types of applications in which embodiments of module 100 may be implemented may include, but are not limited to, signal (including sound and video) analysis, denoising, image recognition, speech enhancement, text topic modeling, source separation, characterization, search, processing, and presentation applications, as well as applications in educational, scientific, medical, publishing, broadcasting, entertainment, media, imaging, acoustic, hydrocarbon exploration (e.g., oil and gas exploration), and other applications in which signal analysis, characterization, representation, modeling, or presentation may be performed. Module 100 may also be used to display, manipulate, modify, classify, and/or store signals, for example to a memory medium such as a storage device or storage medium.

In some embodiments, signal analysis module 100 of FIG. 1 may implement semi-supervised source separation using non-negative techniques, such as a nonnegative matrix factorization (NMF) model. By using the semi-supervised source separation techniques described in this section, the mixture 110 may be modeled. The semi-supervised separation techniques may include receiving a mixed signal 110 containing a combination of a signal of interest with other signals, and separating the signal of interest from the other signals. For example, in a particular scenario where a 'signal of interest' includes human speech, and the 'other signals' include noise (e.g., background noise or the like), an NMF model can be used to separate the human speech from the background noise. In this particular example, the term 'noise' is used to distinguish the 'other signals' from speech. However, it is to be understood that, in some cases, 'noise' may also include other speech signals that might interfere with a particular speech signal that is included in the signal of interest. For example, the particular speech signal may be associated with one speaker's voice. In additional or alternative embodiments, the 'signal of interest' may include other types of signals such as, for example, music or the like.

In certain embodiments, an NMF model may be used by module 100 to model a speech component (or some other component of interest such as image or text data) within a mixed signal. For example, such an NMF source model may use a non-negative spectral dictionary and a Markov chain. The mixture signal 110 may contain a mixture of speech and noise components, and may be modeled using a non-negative factorial hidden Markov model (N-FHMM), for example. In the example of FIG. 1, the source separation may be performed in a semi-supervised manner. Particularly, the source model for the speech component of the mixed signal 110 may be learned from speech training data, whereas a model of the noise component of the mixed signal may be learned during performance of the source separation procedure and in the absence of corresponding training data (i.e., 'on the fly' without training data for the noise component).

Example Nonnegative Matrix Factorization (NMF) Models

In the following paragraphs, three probabilistic NMF models are described. For each of the models, the learning and inference algorithms that have been evaluated are also described. Then, an example experimental setup and example results of that experimental setup are provided in subsequent sections.

Example models are described below with reference to an input power spectrogram. For example, input to the models can be in the form of a given a power spectrogram Y, where $Y_{ft}$ is the power of an input signal at a frequency f and a time t. Three example probabilistic nonnegative matrix factorization (NMF) models are described in the following paragraphs. In certain embodiments, each of the NMF models discussed below are based on a Poisson likelihood model. For example, each of the NMF models can be based on a Poisson likelihood model such as a (NMF) model with a Kullback-Leibler (KL) error measure. In additional or alternative embodiments, other likelihood models besides Poisson likelihood models can be used. For example, certain embodiments could substitute gamma likelihood models for the Poisson likelihood models. According to one such embodiment, a gamma process NMF (GaPNMF) model can be used.

The first model is a Kullback-Leibler (KL) NMF model, referred to herein as a KL-NMF model. The KL-NMF seeks to reduce or minimize the generalized Kullback-Leibler (KL) divergence between the observed data matrix Y and a low-rank approximation obtained by multiplying two non-negative factors, W and H. Examples of two such nonnegative factors are provided as dictionary 520 (matrix W) and activation matrix 520 (matrix H) in FIG. 5. Minimizing the generalized KL divergence is equivalent to assuming that Y is produced by corrupting the reconstruction matrix W H with Poisson noise:

$$Y_{ft} \sim \text{Poisson}(\Sigma_k W_{fk} H_{kt})$$ (equation 1)

and fitting W and H by maximizing the likelihood of Y. In an embodiment, this can be done by alternately applying the multiplicative updates shown in equation 2 below. That is, multiplicative updates can be defined in equation 2:

$$W'_{mk} = W_{mk} \frac{\Sigma_n \frac{H_{kn} X_{mn}}{[W\,H]mn}}{\Sigma_n H_{kn}}; \quad H'_{kn} = H_{kn} \frac{\Sigma_m \frac{W_{nk} X_{mn}}{[W\,H]mn}}{\Sigma_m W_{mk}}$$ (equation 2)

The second model is a Bayesian version of KL-NMF. The existence of W and H is again assumed, and it is also assumed that Y is generated according to equation 1. In one embodiment, it is assumed that each element of W and H was drawn from a prior distribution p(W) and p(H):

$$W_{fk} \sim \text{Gamma}(a, a); \; H_{kt} \sim \text{Gamma}(b, bc).$$ (equation 3)

These priors and the likelihood from equation 1 above imply a posterior distribution $$p(W, H|Y) \propto p(W)p(H)p(Y|W, H).$$ (equation 4)

This posterior distribution may be intractable to normalize. Accordingly, an embodiment uses approximate inference methods such as a variational inference algorithm. This second model is referred to herein as Bayesian KL-NMF (BKL-NMF).

The third model is a Bayesian nonparametric version of BKL-NMF. In a variation on the gamma process NMF (GaPNMF) model, the BKL-NMF model introduces an additional vector of global gains θ, which is endowed with an approximate gamma process prior. The model is as follows:

$$W_{fk} \sim \text{Gamma}(a, a); \; H_{kt} \sim \text{Gamma}(b, bc)$$ (equation 5)

$$\theta_k \sim \text{Gamma}(\alpha/K, \alpha); \; Y_{ft} \sim \text{Exponential}(\Sigma_k W_{fk}\,\theta_k\,H_{kt}).$$

As the number of components K gets large, the prior on θ says that the number of elements of θ greater than some small ε is drawn from a Poisson distribution with mean proportional to α. If $\theta_k$ is near 0, then the contribution of the kth latent component to the likelihood is also near 0, meaning that the kth latent component is effectively not used to explain the data. This gives the model an incentive to use only as many components as are needed to explain the variation in the observed data—the posterior balances the prior's preference for simple explanations with the likelihood's demand that W, H, and θ produce a good approximation to the observed data Y. Herein, this third model is referred to as a gamma process KL-NMF (GaP-KL-NMF) model.

As with the BKL-NMF model, the posterior $p(W, H, \theta|Y)$ may not be tractable to compute. Thus, an embodiment uses an approximate inference for the posterior.

Example Variational Inference Algorithms

One goal of variational inference is to approximate the intractable posterior p(parameters|data) with a distribution q(parameters) chosen from some tractable family of distributions to minimize the Kullback-Leibler (KL) divergence between q and the posterior. To begin with, the case of the BKL-NMF model is discussed, where an embodiment seeks to reduce or minimize the KL divergence between $q(W, H)$ and $p(W, H|Y)$. In an embodiment, the KL divergence to be minimized is $$KL(q(W,H)\|p(W,H|Y)) = \log p(Y) - \mathbb{E}_q[\log p(Y, W, H)] + \mathbb{E}_q[\log q(W, H)]. \quad \text{(equation 6)}$$

A lower bound on the (intractable) marginal log-likelihood log p(Y) can follow immediately from the nonnegativity of the KL divergence:

$$\log p(Y) \geq \mathbb{E}_q[\log p(Y | W, H)] + \mathbb{E}_q\left[\log \frac{p(W, H)}{q(W, H)}\right]. \quad \text{(equation 7)}$$

Maximizing this evidence lower bound (ELBO) is equivalent to minimizing the KL divergence between q and the posterior.

The expectations in this ELBO are not tractable to compute analytically; however, an embodiment can obtain a tractable ELBO by augmenting the model with an additional set of latent variables z. $z_{ftj} \in \{1, \ldots, K\}$ is an index variable that indicates which of the K latent components generated the jth "quantum" of magnitude at frequency f and time t. According to an embodiment, it is assumed that the conditional probability of $z_{ftj}$ given W and H is $$p(z_{ftj} = k | W, H) = \frac{W_{mk} H_{kn}}{\sum_\ell W_{m\ell} H_{\ell n}}. \quad \text{(equation 8)}$$

In mean-field variational inference, an embodiment seeks to approximate $p(W, H, z|Y)$ with a fully factorized distribution $q(W, H, z) = (\prod_{fk} q(W_{fk}))(\prod_{kt} q(H_{kt})) \prod_{ft} \prod_{j=1}^{Y_{ft}} q(z_{ftj})$. In one example, if there is a commitment to using the mean-field approximation, the optimal families for the variational distributions can be as follows:

$$q(W_{fk}) = \text{Gamma}(W_{fk}; \gamma_{fk}^W, \rho_{fk}^W); \quad \text{(equation 9)}$$

$$q(H_{kt}) = \text{Gamma}(H_{kt}; \gamma_{kt}^H, \rho_{kt}^H); \quad q(z_{ftj} = k) = \phi_{ftk}.$$

This q distribution implies the ELBO:

$$\log p(Y) \geq \mathbb{E}_q\left[\log \frac{p(W, H)}{q(W, H)}\right] - \quad \text{(equation 10)}$$

$$\Sigma_{ftk} \mathbb{E}_q[W_{fk} H_{kt}] + \Sigma_{ft} X_{ft} \Sigma_k \phi_{ftk} \mathbb{E}_q\left[\log \frac{W_{fk} H_{kt}}{\phi_{ftk}}\right] \equiv \mathcal{L}$$

which can be maximized by alternating between the following updates:

$$\phi_{ftk}^* = \frac{e^{\mathbb{E}_q[\log W_{fk}]} e^{\mathbb{E}_q[\log H_{kt}]}}{\Sigma_\ell e^{\mathbb{E}_q[\log W_{f\ell}]} e^{\mathbb{E}_q[\log H_{\ell t}]}}; \quad \text{(equation 11)}$$

-continued $$\gamma_{fk}^{W^*} = a + \Sigma_t X_{ft} \phi_{ftk}; \quad \rho_{fk}^{W^*} = a + \Sigma_t \mathbb{E}_q[H_{kt}];$$

$$\gamma_{kt}^{H^*} = b + \Sigma_f X_{ft} \phi_{ftk}; \quad \rho_{kt}^{H^*} = bc + \Sigma_f \mathbb{E}_q[W_{fk}].$$

The expectations can be computed using the identity $r \sim \text{Gamma}(\alpha, \beta) \Rightarrow \mathbb{E}[r] =$ $$\frac{\alpha}{\beta},$$

$\mathbb{E}[\log r] = \psi(\alpha) - \log \beta$, where $\psi(x)$ denotes the digamma function.

A similar derivation for the GaP-KL-NMF model yields similar results. According to an embodiment, $p(z_{ftj} = k | W, H, \theta) \propto W_{fk} H_{kt} \theta_k$, $q(\theta_k) = \text{Gamma}(\theta_k; y_k^\theta, P_k^\theta)$ is chosen, and the ELBO is obtained as follows:

$$\log p(Y) \geq \mathbb{E}_q\left[\log \frac{p(W, H, \theta)}{q(W, H, \theta)}\right] - \Sigma_{ftk} \mathbb{E}_q[W_{fk} H_{kt} \theta_k] + \quad \text{(equation 12)}$$

$$\Sigma_{ft} X_{ft} \Sigma_k \phi_{ftk} \mathbb{E}_q\left[\log \frac{W_{fk} H_{kt} \theta_k}{\phi_{ftk}}\right] \equiv \mathcal{L}$$

which can be maximized by alternating between the following updates:

$$\phi_{ftk}^* = \frac{e^{\mathbb{E}_q[\log W_{fk}]} e^{\mathbb{E}_q[\log H_{kt}]} e^{\mathbb{E}_q[\log \theta_k]}}{\Sigma_\ell e^{\mathbb{E}_q[\log W_{f\ell}]} e^{\mathbb{E}_q[\log H_{\ell t}]} e^{\mathbb{E}_q[\log \theta_\ell]}}; \quad \text{(equation 13)}$$

$$\gamma_{fk}^{W^*} = a + \Sigma_t X_{ft} \phi_{ftk}; \quad \rho_{fk}^{W^*} = a + \Sigma_t \mathbb{E}_q[H_{kt} \theta_k];$$

$$\gamma_{kt}^{H^*} = b + \Sigma_f X_{ft} \phi_{ftk}; \quad \rho_{kt}^{H^*} = bc + \Sigma_f \mathbb{E}_q[W_{fk} \theta_k];$$

$$\gamma_{kt}^{\theta^*} = \frac{\alpha}{K} + \Sigma_{ft} X_{ft} \phi_{ftk}; \quad \rho_k^{\theta^*} = \alpha + \Sigma_{ft} \mathbb{E}_q[W_{fk} H_{kt}].$$

Example Stochastic Structured Mean-Field Techniques

In the following paragraphs, an example is provided for applying a structured stochastic variational inference (SSVI) algorithm to probabilistic NMF models. The SSVI algorithm can restore some of the dependencies between model parameters in a variational distribution q. While this makes the ELBO being optimized intractable to compute, it is still possible to compute a stochastic natural gradient of the ELBO that has the correct expected value, which is all that is needed to optimize q.

In example embodiments using SSVI algorithms, dependence between z and the other parameters is restored. For a GaP-KL-NMF model, an embodiment may use the following conditional variational distribution:

$$q(z_{ftj} = \kappa | W, H, \theta) = p(z_{ftj} = \kappa | W, H, \theta) = \frac{W_{f\kappa} H_{\kappa t} \theta_\kappa}{\Sigma_\ell W_{f\ell} H_{\ell t} \theta_\ell} \quad \text{(equation 14)}$$

For a BKL-NMF model, an embodiment may use a similar conditional variational distribution, but drop the θ terms. An example approximate structured stochastic variational inference (SSVI-A) algorithm for use with the GaP-KL-NMF model is provided below.

---
Algorithm 1 SSVI-A for GaP-KL-NMF
--- initialize variational parameters γ and ρ randomly.
for i = 1, 2, . . . do
    Sample $W^i$~Gamma $(\gamma^W, \rho^w)$.
    Sample $H^i$~Gamma $(\gamma^H, \rho^H)$.
    Sample $\theta^i$~Gamma $(\gamma^\theta, \rho^\theta)$.

Compute $\phi^i_{ftk} = \dfrac{W^i_{fk} H^i_{kt} \theta^i_k}{\sum_\ell W^i_{f\ell} H^i_{\ell t} \theta^i_\ell}$.

Compute step size $\eta^i = i^{-0.5}$.

Update $\gamma^W_{fk} \leftarrow (1-\eta^i)\gamma^W_{fk} + \eta^i(a + \Sigma_t X_{ft}\phi_{ftk})$.
    Update $\rho^W_{fk} \leftarrow (1-\eta^i)\rho^W_{fk} + \eta^i(a + \Sigma_t H^i_{kt}\theta^i_k)$.
    Update $\gamma^H_{kt} \leftarrow (1-\eta^i)\gamma^H_{kt} + \eta^i(b + \Sigma_f X_{ft}\phi_{ftk})$.
    Update $\rho^H_{kt} \leftarrow (1-\eta^i)\rho^H_{kt} + \eta^i(bc + \Sigma_f W^i_{fk}\theta^i_k)$.
    Update $\gamma^\theta_k \leftarrow (1-\eta^i)\gamma^\theta_k + \eta^i\left(\dfrac{\alpha}{K} + \Sigma_{ft} X_{ft}\phi_{ftk}\right)$.
    Update $\rho^\theta_k \leftarrow (1-\eta^i)\rho^\theta_k + \eta^i(\alpha + \Sigma_{ft} W^i_{fk} H^i_{kt})$.

end for

---

It is straightforward to verify that this choice of variational distribution effectively eliminates z from the ELBO:

$$\mathcal{L} = \mathbb{E}_q[\log p(W, H, z, Y)] - \mathbb{E}_q(\log q(W, H, z)) \quad \text{(equation 15)}$$

$$= \mathbb{E}_q\left[\log\dfrac{p(W, H, Y)}{q(W, H)}\right] + \mathbb{E}_q\left[\log\dfrac{p(z \mid W, H, Y)}{q(z \mid W, H)}\right]$$

$$= \mathbb{E}_q\left[\log\dfrac{p(W, H, Y)}{q(W, H)}\right].$$

Optimizing this structured ELBO can yield a better approximation to the posterior p(W, H|Y) than would be possible by introducing z and applying the mean-field approximation.

The implicit form for q(z,W|H) may make it intractable to compute the structured ELBO. Embodiments address this issue by sampling from q(W,H) in order to obtain unbiased stochastic natural gradients of the structured ELBO, which can be used to minimize the KL divergence between q(W,H) and p(W,H|Y). According to an additional or alternative embodiment, referred to as approximate structured stochastic variational inference (SSVI-A), a simplifying approximation is applied to this stochastic natural gradient, accepting some bias in exchange for simplicity of implementation, more stable updates, and lower variance. As discussed in the example results section below, the SSVI-A algorithm is an approach that achieves accurate results. Applying SSVI-A for a GaP-KL-NMF model is outlined in algorithm 1 above. SSVI-A for a BKL-NMF model is completely analogous, except it excludes the θ variables.

Figure 5:
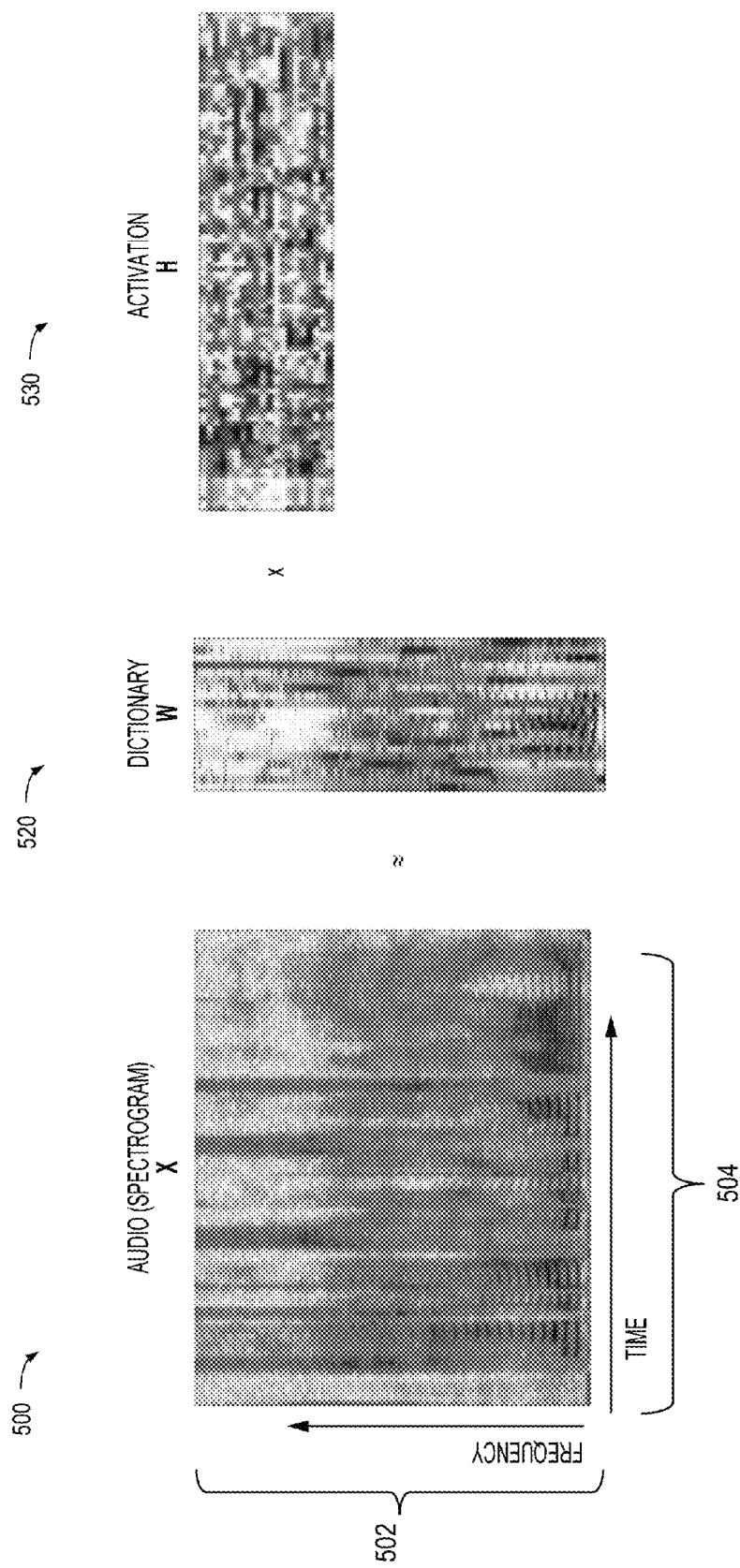
FIG. 5 illustrates an example of modeling noise in a given audio spectrogram, in accordance with embodiments.

An example noise spectrogram 500 and corresponding dictionary 520 of basis spectrums and activation weights 530 is shown in FIG. 5. In the example of FIG. 5, rows correspond to frequencies 502, which can be indexed with and the columns correspond to times 504, which can also be indexed to get a sense of how much energy there, is in a signal, at each frequency at each time.

In one embodiment, an NMF model assumes that the spectrogram 500 is made up, at each time point 504, of a linear combination of nonnegative basis vectors which are in a dictionary 520, which is labelled as matrix W in FIG. 5. In an example, each element or component in dictionary 520 corresponds to a substantially static, isolated spectrum. In the example of FIG. 5, spectrogram 500 can have clean speech and noise on top of each other.

In the example of FIG. 5, a model can include a dictionary 520 of speech vectors and noise vectors and then these vectors get mixed together by activation matrix 530, which is labelled as matrix H in FIG. 5. In an embodiment, each column of activation matrix 530 indicates how active each one of the dictionary elements in dictionary 520 is at every time 504. As shown in FIG. 5, one can multiply dictionary 520 and activation matrix 530 so that a weighted combination of all of these elements is produced, where the weight is given. In an embodiment, the weight for each element is given by a column of activation matrix 530, and then that gives values that approximately reconstruct the appropriate column of the input spectrogram 500.

There may be a disconnect between the observed spectrogram data and the approximate reconstruction produced by multiplying W (spectrogram 520) and H (activation matrix 530). The techniques described herein can deal with this situation by assuming that the observed spectrogram data was obtained by corrupting the product of the dictionary 520 and the activation 530 matrix with some noise. In some examples, the noise can conform to a Poisson distribution. In other examples, the noise can conform to another kind of noise such as, for example, a gamma distribution.

The approximation shown in FIG. 5 for spectrogram 500 indicates that some techniques are not expected to be able to perfectly reconstruct spectrogram 500 using a finite dictionary such as dictionary 520, and a finite activation matrix 530. This is because there may not be enough parameters. For example, there may be fewer parameters than the number of observations. As a result, the models and algorithms disclosed herein are needed to reconstruct the input (e.g., input mixture 110 of FIG. 1). By using the above-described models and algorithms, embodiments can de-noise noisy observations, without having to accept trade-offs when fitting a dictionary 520.

In cases where there is not enough data to be able to determine what the original clean signal was like (e.g., what the clean sound sounded like), the techniques described herein enable a user to make assumptions that are consistent with the way the signal was produced so that you can reconstruct a signal that is a substantially correct approximation of the original clean signal.

Example Results

Results of experiments attest to the ability of using mean-field (MF) and approximate structured stochastic variational inference (SSVI-A) algorithms. For example, the results show that MF and SSVI-A algorithms can be used to discover latent components that were used to generate a synthetic spectrogram. An example synthetic spectrogram 600 is shown in FIG. 6.

Figure 6:
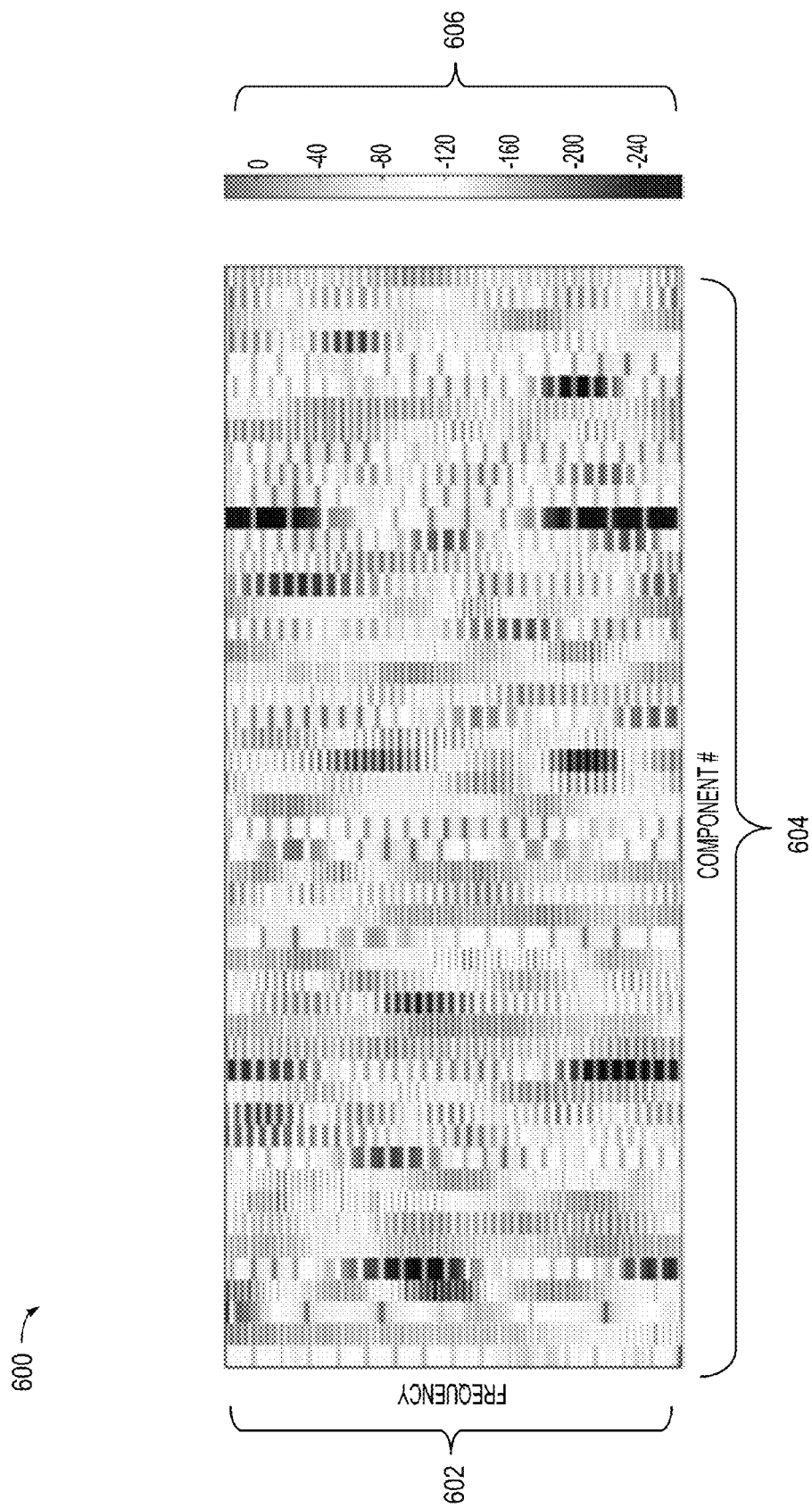
FIG. 6 depicts harmonic spectra with different spectral shapes and fundamental frequencies, in accordance with embodiments.

First, a 257-by-50 matrix W of 50 harmonic spectra was randomly generated with different spectral shapes and fundamental frequencies (See, e.g., frequencies 602 and components 604 in FIG. 6). In the example of FIG. 6, each of the components 604 in spectrogram 600 have different spectral shapes 606 at a given frequencies 602. Next, a 50-by-1000 matrix H of activations was randomly sampled, with each element $H_{kt}$ being drawn independently from a gamma distribution with shape parameter 0.2 and inverse-scale parameter 0.2. Finally, a spectrogram Y was generated; where each element $Y_{ft}$ in the spectrogram was drawn independently from a Poisson distribution with mean $\Sigma_k W_{fk} H_{kt}$.

Figure 3A:
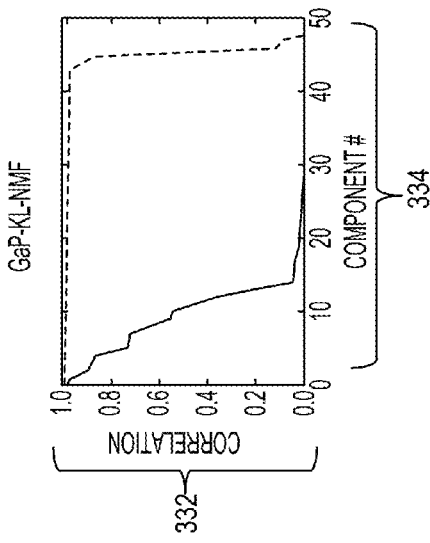
FIG. 3A is a plot of a sorted diagonal of a correlation matrix depicting correlations between true dictionary elements and spectra discovered using a KL-NMF model, in accordance with embodiments.
Figure 3B:
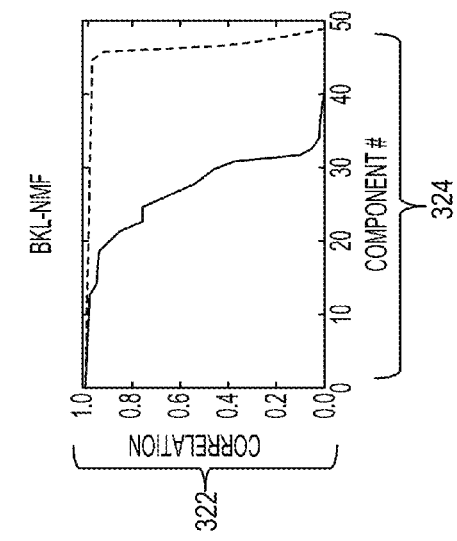
FIG. 3B is a plot of a sorted diagonal of a correlation matrix depicting correlations between true dictionary elements and spectra discovered using a BKL-NMF model, in accordance with embodiments.
Figure 3C:
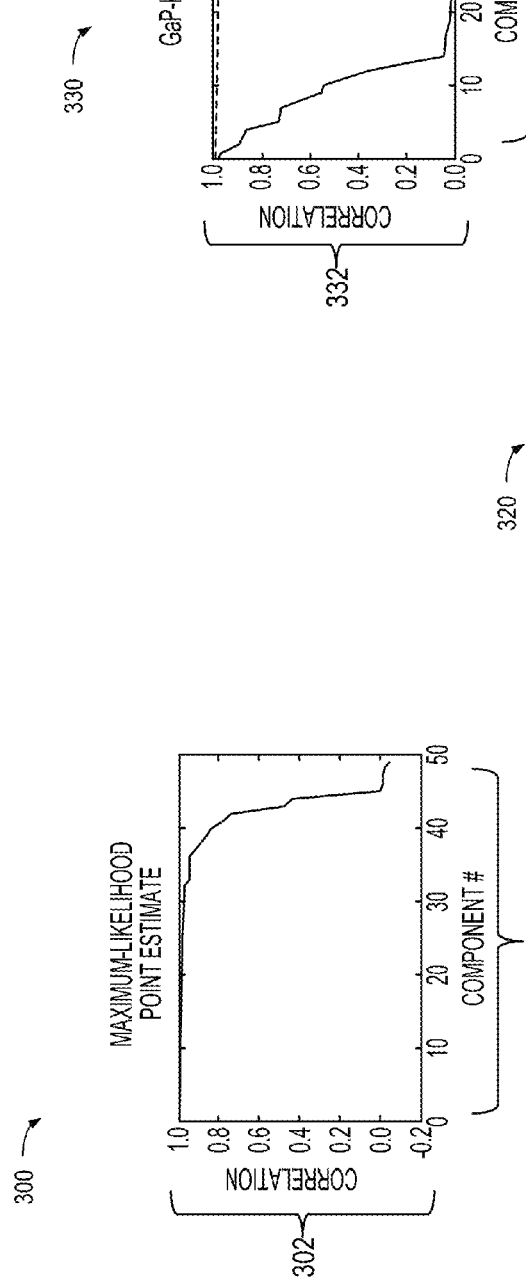
FIG. 3C is a plot of a sorted diagonal of a correlation matrix depicting correlations between true dictionary elements and spectra discovered using a GaP-KL-NMF model, in accordance with embodiments.

As a baseline, a KL-NMF model was fit with 50 latent components using multiplicative updates. Multiplicative updates are defined in equation 2, which is shown above. FIG. 2A shows a matrix 200 of correlations between true components 204 from dictionary W and discovered components 202 in a dictionary learned by KL-NMF. FIG. 3A is a plot 300 of the sorted diagonal of the correlation matrix of FIG. 2A. As shown in FIG. 3A, the KL-NMF model can recover most of the true spectra with high fidelity, but the accuracy begins to degrade after the best 40 components. In FIGS. 3A-3C, the plotted solid lines represent a maximum-likelihood or mean-field variational inference.

Figures 4A, 4B:
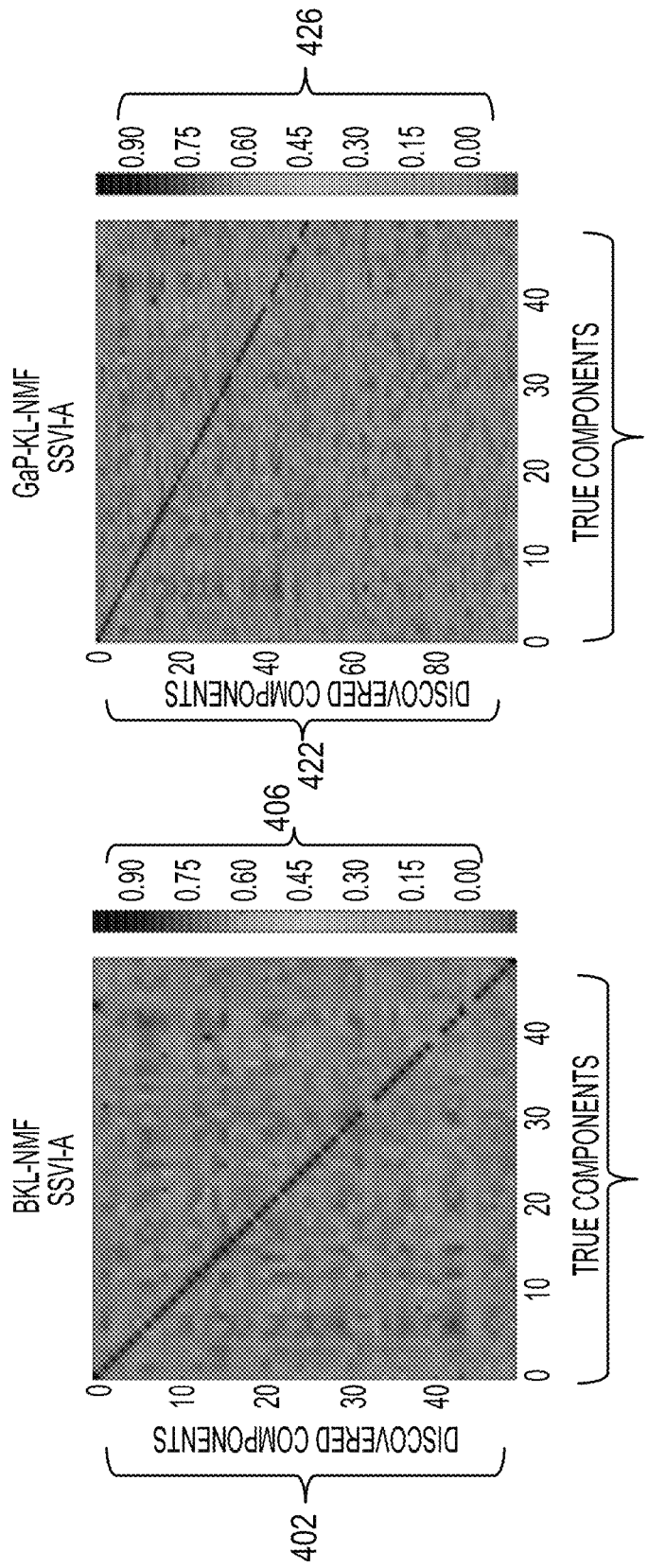
FIG. 4A is a correlation matrix depicting correlations between true dictionary elements and spectra discovered using an approximate structured stochastic variational inference (SSVI-A) algorithm and a BKL-NMF model, in accordance with embodiments.
FIG. 4B is a correlation matrix depicting correlations between true dictionary elements and spectra discovered using the SSVI-A algorithm and a GaP-KL-NMF model, in accordance with embodiments.

Next, a BKL-NMF model is fit with 50 latent components using mean-field variational inference. The prior hyperparameters were set to α=0.25, b=0.2, and c=1. The correlation matrix 220 is shown in FIG. 2B. FIG. 3B shows a plot 320 of the sorted diagonal of the correlation matrix from FIG. 2B. In FIGS. 3B and 3C, the plotted dashed lines represent structured stochastic variational inference. As shown in FIG. 3B, despite the additional complexity and regularization of the variational method, it is worse at recovering components 324 in the dictionary W from the observed spectrogram than the baseline KL-NMF model. In FIG. 2B, the constant bands in the correlation matrix 220 correspond to components that the BKL-NMF model failed to use, despite the fact that there was still uncaptured structure in the data. As shown in FIGS. 4A and 3B, applying the SSVI-A algorithm to the BKL-NMF model yields better results. For example, in FIG. 3B, all but a few of the available components 324 are used, and the results with the BKL-NMF model are better than those obtained using a simple KL-NMF model.

As shown in FIG. 3C, a GaP-KL-NMF model was fit with a maximum of 100 latent components 334 using both SSVI-A and MF algorithms. In this example, the prior hyperparameters were α=50, a=0.25, and b=0.2. FIG. 4B illustrates a correlation matrix 420 of correlations 426 between true components 424 and discovered components 422. As can be seen by comparing FIGS. 4B and 2C, the correlation values 426 using a GaP-KL-NMF model with the SSVI algorithm are higher than correlation values 236 in FIG. 2C, which represents results from using the GaP-KL-NMF model with the mean-field (MF) algorithm. FIG. 3C plots the first 50 components 334 of the diagonal of this matrix. FIG. 3C shows how a MF algorithm may perform poorly, by grossly underestimating the number of components 334. In FIG. 3C, the solid line represents MF, with low correlation values 332 for components 334. On the other hand, as shown in FIGS. 3C and 4B, the SSVI-A algorithm applied to the GaP-KL-NMF model manages to recover nearly all of the components (components 304 and 424, respectively), very accurately (as represented by correlation values 302 and 426, respectively), despite not having precise prior knowledge of how many components it was looking for. For example, in FIG. 3B, the correlation values 302 remain high across a wide range of components 304. The example results shown by comparing FIGS. 2C, 3C, and 4B show that a GaP-KL-NMF model, when used with the SSVI-A algorithm, discovers all of the bases that it is supposed to, and no more, despite having the option of using 100 bases.

Example Methods

Figure 7:
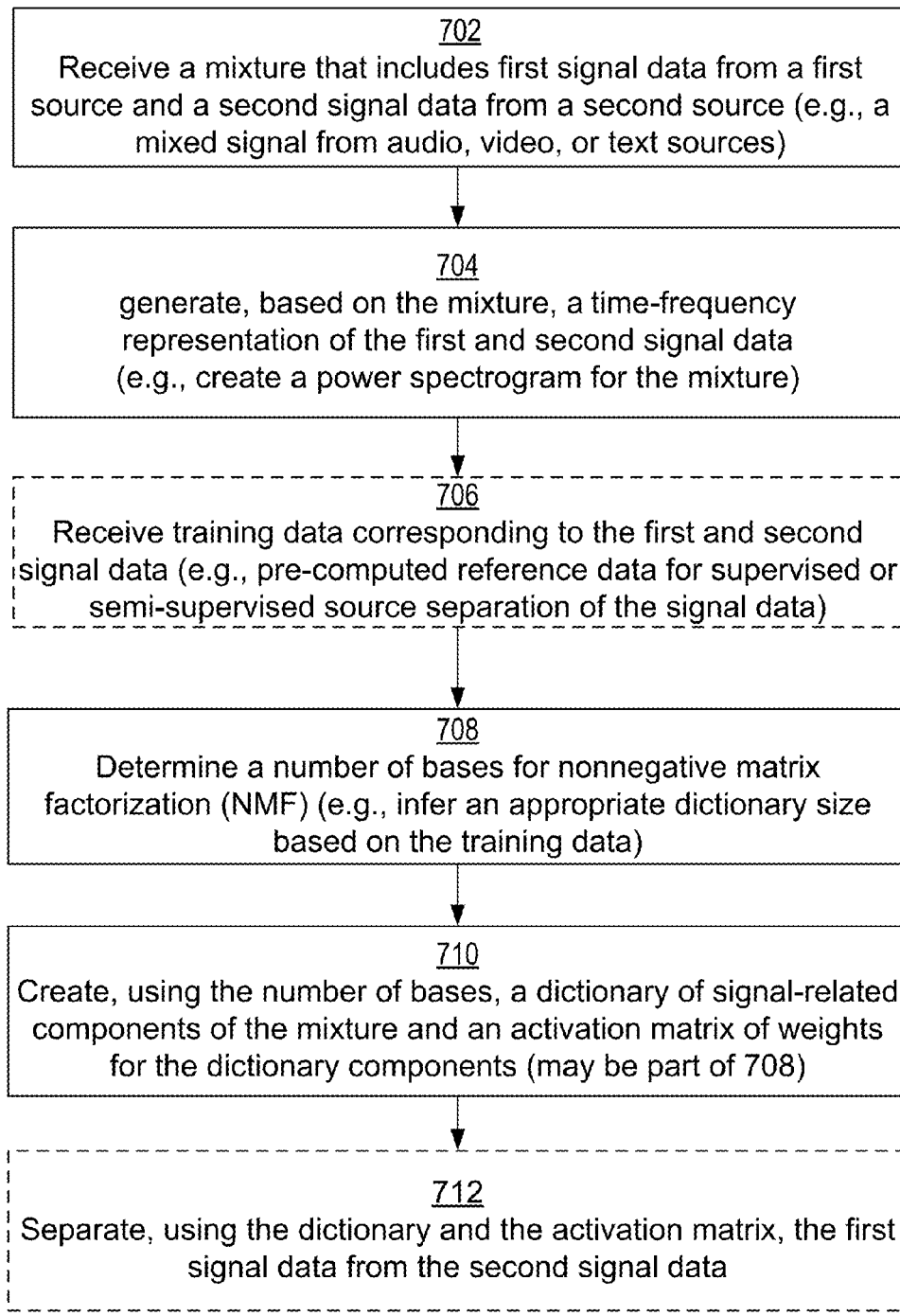
FIG. 7 is a flow chart illustrating an example method for determining a number of bases to facilitate source separation using nonnegative matrix factorization (NMF) models, in accordance with embodiments.

FIG. 7 is a flow chart illustrating an example method 700 for determining an appropriate number of bases for a nonnegative matrix factorization (NMF) model. The NMF model can be used for source separation, where the source can be, for example, an audio or video source. For illustrative purposes, method 700 is described with reference to the system environment depicted in FIG. 1. Optional and/or additional blocks are indicated in the flowchart by dashed lines.

The method 700 begins at 702 where a mixture is received that includes first signal data from a first source and a second signal data from a second source. In the example of FIG. 7, the mixture can include signal data from audio, video, or text sources. For example, the mixture received at 702 can be the mixture 110 described above with reference to FIG. 1.

Next, at 704, a time-frequency representation of the first and second signal data is generated. As shown in FIG. 7, time-frequency representation is generated based on the mixture, and the time-frequency representation can be embodied as a spectrogram for the mixture received at 702.

At optional block 706, training data corresponding to the first and second signal data is received. As shown, 706 can comprise receiving pre-computed reference data the first and second signal data. In an embodiment, block 706 is optional and is only performed when supervised or semi-supervised source separation of the signal data is to be performed. For example, in cases where unsupervised source separation is to be carried out, block 706 is bypassed and no training data is received or used in method 700. In cases where the first and second signal data corresponds to audio signals, training data received at 706 can include sounds of interest, such as for example, spoken words, sound patterns, or sounds associated with a given audio source. For example, the training data for the first signal data can include sounds associated with a certain person's voice (e.g., speech training data for a speaker), a certain musical instrument, or other audio sources that are of interest. The training data can also include noises that are to be separated and removed from the received mixture. For example, training data for the second signal data can include background sounds associated with a keyboard, a siren, feedback, or other unwanted audio sources. That is, the training data can include isolated training signals for the first and second signal data. In an embodiment, if the mixed signal received at 702 received from a text source, training data received at 706 can define a corpus of words and a plurality of valid sequences of the words of the corpus. For example, the training data for text data sources can include words, terms, and phrases of interest. According to another embodiment, if the mixed signal is associated with one or more audio sources, the training data can define a corpus of sounds and a plurality of valid sequences of the sounds of the corpus. In an additional embodiment, if the mixed signal is associated with one or more video sources, the training data can include images of interest.

Next, at 708, a number of bases for nonnegative matrix factorization (NMF) is determined. As shown, block 708 can be performed by inferring an appropriate number of bases based on training data received at optional block 706. According to embodiments, the equations and algorithms described above can be used to determine an appropriate number of bases for NMF in block 708. For example, an SSVI algorithm can be applied to the mixture received at 702 in order to determine a size of a dictionary (e.g., bases) for an NMF model. Once the number of bases is determined, control can be passed to block 710. In one embodiment, blocks 708 and 710 can be performed together by a single module.

At block 710, the number of bases determined at 708 is used to construct a dictionary of signal-related components of the mixture, where the dictionary is part of an NMF model. In certain embodiments, any of the three NMF models described herein can be used to perform block 710.

In the example of FIG. 7, block 710 can be performed as part of 708. That is, 708 and 710 may be performed simultaneously as a single step. As shown, 710 can also include populating an activation matrix of weights for the dictionary components. In cases where the first and second signal data corresponds to audio signals, the dictionary and activation matrix created at 710 can resemble dictionary 520 and activation matrix 530 described above with reference to FIG. 5.

Next, at optional block 712, the dictionary and the activation matrix created at 710 can be used to separate the first signal data from the second signal data. Block 712 can be performed to isolate data from a first source from data from another source. For example, if method 700 is carried out on a musical audio mixture where the first source is a guitar and the second source is a piano, performing block 712 will separate the guitar audio signal from that of the piano.

The example methods and systems for using hierarchical Bayesian modeling to implement various NMF-based source separation techniques offer several advantages over conventional techniques. For example, the methods and systems enable assumptions to be explicitly set out and leveraged. Also, for example, the methods and systems deal naturally with uncertainty. Further, for example, the methods and systems provide a principled framework for determining hyperparameters, such as, for example, the number of latent components needed to capture the variation in the data. Also, by using the SSVI-A algorithm described herein, pernicious effects of mean-field approximation can be resolved, thus providing the benefits of a fully Bayesian treatment while also avoiding the pernicious effects of mean-field approximation.

As used herein, the term "signal" is used to refer to a physical signal (e.g., an acoustic signal) and to a representation of a physical signal (e.g., an electromagnetic signal representing an acoustic signal or a video signal). In some embodiments, a signal may be recorded in any suitable medium and in any suitable format. For example, a physical signal may be digitized, recorded, and stored in a memory of a computing device. The recorded signal may be compressed with commonly used compression algorithms. Typical file formats for audio signals may include, for example, WAV, OGG, RIFF, RAW, AU, AAC, MP4, MP3, WMA, RA, etc.

As used herein, the term "source" generally refers to any entity (or type of entity) that may be appropriately modeled as such. For example, a source may be an entity that produces, interacts with, or is otherwise capable of producing or interacting with a signal. For example, in acoustics, a source may be a musical instrument, a person's vocal cords, or a machine. In some cases, each source (e.g., a particular musical instrument such as a guitar) may be modeled as a plurality of individual sources (e.g., each string of a guitar). In certain examples, entities that are not otherwise capable of producing a signal but instead reflect, refract, or otherwise interact with a signal may be modeled as a source. For example, a wall of an enclosure that reflects sounds can be a source. Also, for example, a mirror that reflects images can be a source for image signals. In some cases, two different entities of the same type (e.g., two different musical instruments of the same type) may be considered to be the same source for modeling purposes. In some examples, the term source may also refer to a signal coming from any entity or type of entity. Example sources for audio signals may include noise, speech, music, singing, etc.

As used herein, the terms "mixed signal" and "sound mixture" refer to a signal that results from a combination of signals that originated from two or more sources into a lesser number of channels. In an example for audio signals, music can include parts played by different musicians with different instruments, where each instrument or part may be recorded in an individual channel. Later, these recording channels can be mixed down to only one (mono) or two (stereo) channels. If each instrument were modeled as a source, then the resulting signal would be considered to be a mixed signal. In certain cases, a mixed signal need not be recorded, but may instead be a "live" signal, for example, from a live camera feed, a live musical performance, or the like. In some cases, even so-called "single sources" may be modeled as producing a "mixed signal" as mixture of images in the case of video signals, or as a mixture of sound and noise in the case of audio signals.

As used herein, the term "stationary noise" refers to noise having a spectral profile that remains almost the same over time. A spectral profile of example stationary noise will have a frequency that is substantially the same over time. As used herein, the term, "non-stationary noise" refers to noise having a spectral profile that may change rapidly and significantly over time. Non-limiting examples of non-stationary noise include keyboard noise, ringtones, sirens, fireworks, and motorcycle noise.

Example Computer System Implementation

Figure 8:
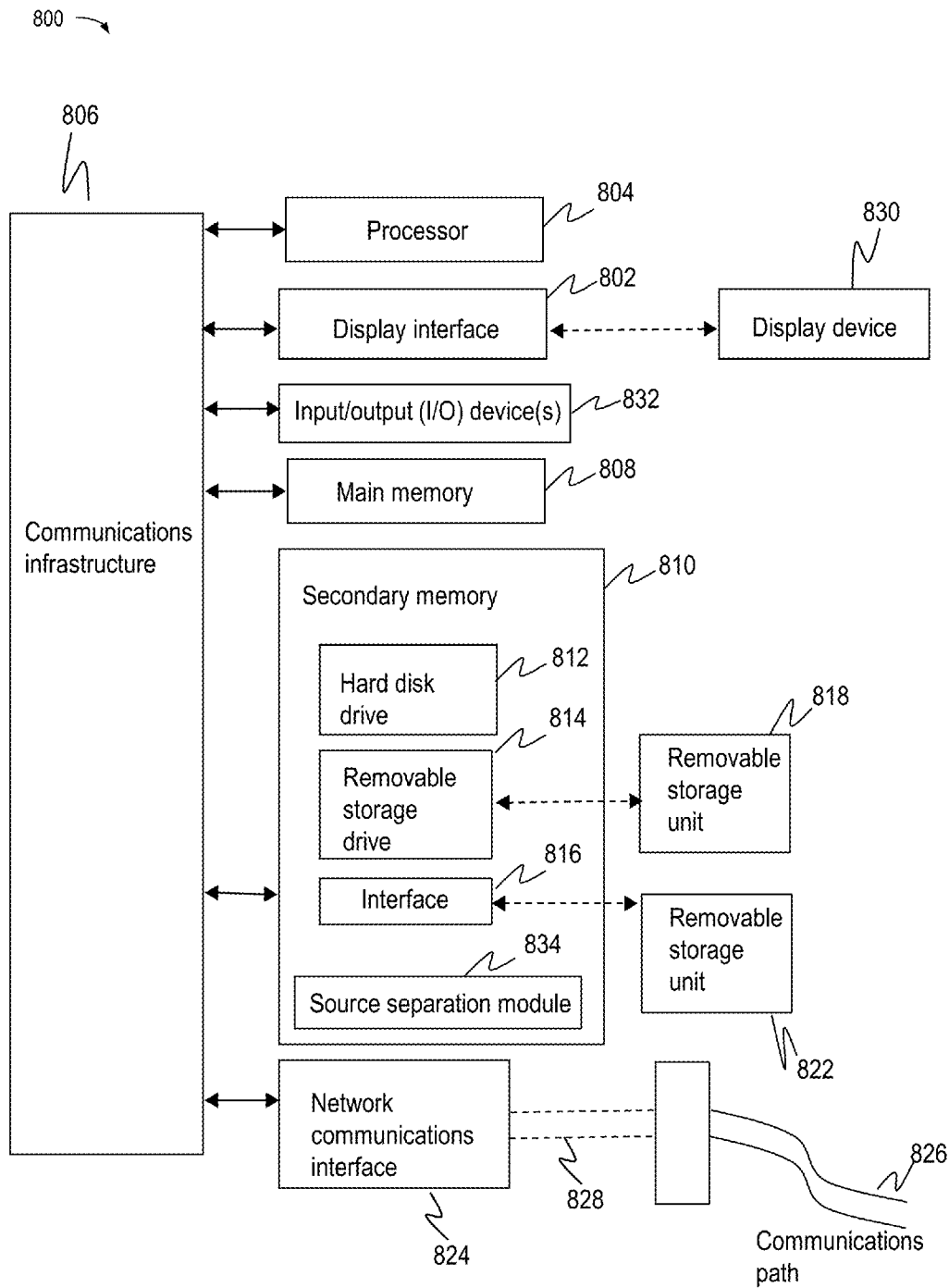
FIG. 8 is a diagram of an exemplary computer system in which embodiments of the present disclosure can be implemented.

Although exemplary embodiments have been described in terms of systems and methods, it is contemplated that certain functionality described herein may be implemented in software on microprocessors, such as processors included in a computing device used to implement the source separation system shown in FIG. 1, and computing devices such as the computer system 800 illustrated in FIG. 8. In various embodiments, one or more of the functions of the various components may be implemented in software that controls a computing device, such as computer system 800, which is described below with reference to FIG. 8.

Aspects of the present invention shown in FIGS. 1-7, or any part(s) or function(s) thereof, may be implemented using hardware, software modules, firmware, tangible computer readable media having logic or instructions stored thereon, or a combination thereof and may be implemented in one or more computer systems or other processing systems.

FIG. 8 illustrates an example computer system 800 in which embodiments of the present invention, or portions thereof, may be implemented as computer-readable instructions or code. For example, some functionality performed by the source separation module 100 shown in FIG. 1, can be implemented in the computer system 800 using hardware, software, firmware, non-transitory computer readable media having instructions stored thereon, or a combination thereof and may be implemented in one or more computer systems or other processing systems. Hardware, software, or any combination of such may embody certain modules and components used to implement blocks in the method 700 illustrated by the flowchart of FIG. 7 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general-purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme. In certain embodiments, one or more of the components described above with reference to FIG. 1 can be embodied as the processor device 804 shown in FIG. 8.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a magnetic tape drive, an optical disk drive, a flash memory, or the like. In non-limiting embodiments, one or more of the dictionaries 104 and 520 described above with reference to FIGS. 1 and 5 can be stored in the main memory 808 shown in FIG. 8. In the example embodiment shown in FIG. 8, the source separation module 100 can be stored in secondary memory 810. In additional or alternative embodiments, instructions for implementing source separation module 100 can be stored in main memory 808, or in a combination of main memory 808 and secondary memory 810.

The removable storage drive 814 reads from and/or writes to a removable storage unit 818 in a well-known manner. Removable storage unit 818 may comprise a magnetic tape, optical disk, etc. which is read by and written to by removable storage drive 814. As will be appreciated by persons skilled in the relevant art, removable storage unit 818 includes a non-transitory computer readable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800. In non-limiting embodiments, the main memory 808 shown in FIG. 8 can be used to store the output results 120 described above with reference to FIG. 1.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data 828 transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

As used herein, the terms "computer readable medium" and "non-transitory computer readable medium" are used to generally refer to media such as memories, such as main memory 808 and secondary memory 810, which can be memory semiconductors (e.g., DRAMs, etc.). Computer readable medium and non-transitory computer readable medium can also refer to removable storage unit 818, removable storage unit 822, and a hard disk installed in hard disk drive 812. Signals carried over communications path 826 can also embody the logic described herein. These computer program products are means for providing software to computer system 800. A computer-readable medium may comprise, but is not limited to, an electronic, optical, magnetic, or other storage device capable of providing a processor with computer-readable instructions. Other examples comprise, but are not limited to, a floppy disk, a CD-ROM, a DVD, a magnetic disk, a memory chip, ROM, RAM, an ASIC, a configured processor, optical storage, magnetic tape or other magnetic storage, or any other medium from which a processor such as processors used to implement the module 100 and user interface 102 components shown in FIG. 1, or processor device 804 can read instructions. The instructions may comprise processor-specific instructions generated by a compiler and/or an interpreter from code written in any suitable computer-programming language. Non-limiting examples of a suitable programming language can include C, C++, C#, Visual Basic, Java, Python, Perl, JavaScript, and ActionScript.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the steps in the method 700 illustrated by the flowchart of FIG. 7 discussed above. Accordingly, such computer programs represent controllers of the computer system 800. Where an embodiment of the invention is implemented using software, the software may be stored in a computer program product and loaded into computer system 800 using removable storage drive 814, interface 820, and hard disk drive 812, or communications interface 824.

In an embodiment, a display device used to display the matrices and plots of FIGS. 2-4 may be a computer display 830 shown in FIG. 8. The computer display 830 of computer system 800 can be implemented as a touch sensitive display (i.e., a touch screen). Similarly, the UI 102 of FIG. 1 may be implemented using display interface 802 shown in FIG. 8.

Embodiments of the invention also may be directed to computer program products comprising software stored on any computer readable medium. Such software, when executed in one or more data processing device, causes a data processing device(s) to operate as described herein. Embodiments employ any computer readable medium. Examples of computer useable mediums include, but are not limited to, primary storage devices (e.g., any type of random access memory), secondary storage devices (e.g., hard drives, floppy disks, CD ROMS, DVDs, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks and steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method for source separation based on determining a number of bases for a nonnegative matrix factorization (NMF) model, the method comprising:
receiving, at a computing device, a mixed signal including a combination of first signal data and second signal data;
generating, by the computing device, a time-frequency representation of the mixed signal;
determining, by applying a structured stochastic variational inference (SSVI) algorithm to the NMF model, a number of bases for a dictionary of signal-related components of the mixed signal, wherein applying the SSVI algorithm comprises varying the number of bases within a range and selecting the number of bases from the range based on training data;
constructing, using the number of bases and the time-frequency representation, the dictionary and an activation matrix of weights, the weights indicating how active each one of the signal-related components is at a given time; and
separating, using the dictionary and the activation matrix, the first signal data from the second signal data.

2. The method of claim 1, wherein the determining and the constructing are performed simultaneously.

3. The method of claim 1, wherein the generating includes creating a power spectrogram based on the first and second signal data, and wherein the signal-related components include vectors of the first signal data and vectors of the second signal data.

4. The method of claim 1, wherein the first signal data includes a signal of interest emitted by a first source, and wherein the second signal data includes a noise signal emitted by a second source.

5. The method of claim 1, wherein the separating comprises multiplying the signal-related components and the weights to produce a weighted combination of the signal-related components and weights usable to reconstruct a first signal representing the first signal data. data.

6. The method of claim 1, further comprising receiving the training data, wherein:
the first signal data includes a first signal from a first text source;
the second signal data includes a second signal from a second text source; and
the training data defines a corpus of words and a plurality of valid sequences of the words of the corpus.

7. The method of claim 1, further comprising receiving the training data, wherein:
the first signal data includes a first audio signal emitted by a first audio source;
the second signal data includes a second audio signal emitted by a second audio source; and
the training data defines a corpus of sounds and a plurality of valid sequences of the sounds of the corpus.

8. The method of claim 1, further comprising receiving the training data, wherein the mixed signal is associated with one or more video sources, and wherein the training data defines a corpus of images of interest and a plurality of valid sequences of the images of the corpus.

9. The method of claim 1, wherein the NMF model is one of a Kullback-Leibler (KL) NMF model, a Bayesian KL-NMF model, and a gamma process KL-NMF model.

10. The method of claim 1, wherein the NMF model a gamma process NMF (GaPNMF) model.

11. A system for source separation based on determining a number of bases for a nonnegative matrix factorization (NMF) model, the system comprising:
a computing device comprising a processor and a memory having executable instructions stored thereon, that, when executed by the processor, cause the computing device to perform operations comprising:
receiving a mixed signal including a combination of first signal data and second signal data;
generating, by the computing device, a time-frequency representation of the mixed signal;
determining, by applying a structured stochastic variational inference (SSVI) algorithm to the NMF model, a number of bases for a dictionary of signal-related components of the mixed signal, wherein applying the SSVI algorithm comprises varying the number of bases within a range and selecting the number of bases from the range based on training data;
constructing, using the number of bases and the time-frequency representation, the dictionary and an activation matrix of weights, the weights indicating how active each one of the signal-related components is at a given time; and
separating, using the dictionary and the activation matrix, the first signal data from the second signal data.

12. The system of claim 11, wherein the generating includes creating a power spectrogram based on the first and second signal data, and wherein the signal-related components include vectors of the first signal data and vectors of the second signal data.

13. The system of claim 11, wherein the first signal data includes a signal of interest emitted by a first source, and wherein the second signal data includes a noise signal emitted by a second source.

14. The system of claim 11, wherein the separating comprises multiplying the dictionary components and the activation weights to produce a weighted combination of the components and weights usable to reconstruct a first signal representing the first signal data.

15. The system of claim 11, the operations further comprising receiving the training data, wherein:
the first signal data includes a first signal from a first text source;
the second signal data includes a second signal from a second text source; and
the training data defines a corpus of words and a plurality of valid sequences of the words of the corpus.

16. The system of claim 11, the operations further comprising receiving the training data, wherein:
the first signal data includes a first audio signal emitted by a first audio source;
the second signal data includes a second audio signal emitted by a second audio source; and
the training data defines a corpus of sounds and a plurality of valid sequences of the sounds of the corpus.

17. The system of claim 11, the operations further comprising receiving the training data, wherein the mixed signal is associated with one or more video sources, and wherein the training data defines a corpus of images of interest and a plurality of valid sequences of the images of the corpus.

18. The system of claim 11, wherein the NMF model is one of a Kullback-Leibler (KL) NMF model, a Bayesian KL-NMF model, and a gamma process KL-NMF model, and a gamma process NMF (GaPNMF) model.

19. A non-transitory computer readable storage medium having executable instructions stored thereon, that, when executed by a computing device, cause the computing device to perform operations for source separation based on determining a number of bases for a nonnegative matrix factorization (NMF) model, the instructions comprising:
instructions for receiving a mixed signal including a combination of first signal data and second signal data;
instructions for generating a time-frequency representation of the mixed signal;
instructions for determining, by applying a structured stochastic variational inference (SSVI) algorithm to the NMF model, a number of bases for a dictionary of signal-related components of the mixed signal, wherein applying the SSVI algorithm comprises varying the number of bases within a range and selecting the number of bases from the range based on training data;
instructions for constructing, using the number of bases and the time-frequency representation, the dictionary and an activation matrix of weights, the weights indicating how active each one of the signal-related components is at a given time; and
instructions for separating, using the dictionary and the activation matrix, the first signal data from the second signal data.

20. The non-transitory computer readable storage medium of claim 19, wherein the dictionary is a matrix of isolated spectra from the mixed signal, and wherein the weights in the activation matrix indicate how active latent components are as a function of time.

* * * * *

UNITED STATES PATENT AND TRADEMARK OFFICE
CERTIFICATE OF CORRECTION

PATENT NO.      : 9,553,681 B2
APPLICATION NO. : 14/624220
DATED           : January 24, 2017
INVENTOR(S)     : Matthew Douglas Hoffman Page 1 of 1

It is certified that error appears in the above-identified patent and that said Letters Patent is hereby corrected as shown below:

In the Claims

Column 20, Line 67:
Delete "signal representing the first signal data. data."
Insert --signal representing the first signal data.--

Signed and Sealed this
Sixteenth Day of May, 2017

Michelle K. Lee
*Director of the United States Patent and Trademark Office*